United States Patent [19]

Anderson, Jr. et al.

[11] Patent Number: 4,894,872
[45] Date of Patent: Jan. 23, 1990

[54] WATERLESS SANITATION SYSTEM WITH VENTILATION

[75] Inventors: Charles M. Anderson, Jr.; Stephen C. Cline, both of Zionsville, Ind.

[73] Assignee: Outdoor Sanitation Corp., Zionsville, Ind.

[21] Appl. No.: 264,028

[22] Filed: Oct. 28, 1988

[51] Int. Cl.⁴ ............................................ A47K 11/00
[52] U.S. Cl. ........................................ 4/482; 4/475; 4/477; 4/347; 4/DIG. 19; 4/DIG. 12
[58] Field of Search ................... 4/449, 460, 462, 463, 4/472, 474, 475 X, 476, 477 X, 479, 482, 347 X, 111.1, 111.2, 111.3, 218, 216, 459, DIG. 19 X, DIG. 12 X; 210/532.1, 207, 472, 758

[56] References Cited

U.S. PATENT DOCUMENTS

| | | | |
|---|---|---|---|
| 1,267,401 | 5/1918 | Greene | 4/475 |
| 1,334,192 | 3/1920 | Thomas et al. | 4/472 |
| 3,136,608 | 6/1964 | Lindström | 4/475 |
| 3,546,718 | 12/1970 | Minnitte | 4/460 |
| 3,776,383 | 12/1973 | Hargraves | 4/111.1 |
| 4,174,371 | 11/1974 | Bell et al. | 4/DIG. 12 |
| 4,254,515 | 3/1981 | Kiyama et al. | 4/472 |
| 4,313,234 | 2/1982 | Stewart | 4/449 |
| 4,501,665 | 2/1985 | Wilhelmson | 210/630 |
| 4,581,780 | 4/1986 | Hoskins et al. | 4/460 |

FOREIGN PATENT DOCUMENTS 1054307  5/1979  Canada ........................ 4/DIG. 12

Primary Examiner—Henry J. Recla
Assistant Examiner—Edward C. Donovan
Attorney, Agent, or Firm—Woodard, Emhardt, Naughton, Moriarty & McNett

[57] ABSTRACT

A waterless sanitation system with ventilation. A toilet within a building is located over a pit having a solids holding basket suspendedly mounted within a liquids holding tank. A plurality of air inlet pipes extend externally of the building downwardly through the basket and into the liquids holding tank with a plurality of apertures provided on the pipes allowing the air to enter both the basket and tank. An exit pipe extends upwardly from the tank through the basket and through the roof of the building. A plurality of apertures in the exit pipe allow the gas within the tank and basket to escape. An exhaust fan is provided to pull the air downwardly through the inlet pipes and the gas outwardly through the exhaust pipe. The inlet pipes have mouths oriented to catch the wind assisting the flow of air.

10 Claims, 1 Drawing Sheet

WATERLESS SANITATION SYSTEM WITH VENTILATION

BACKGROUND OF THE INVENTION

1. Field of the Invention:

This invention is in the field of self-contained sewage treatment systems coupled with outdoor sanitary facilities.

2. Description of the Prior Art

A variety of different types of outdoor sanitary facilities have heretofore been provided and typically have many disadvantages including the unpleasant odor associated therewith. For example, pit latrines provide a health hazard. unpleasant odors, pollution of nearby ground water and user dissatisfaction. Vault latrines provide anaerobic conditions, unpleasant odors and user dissatisfaction. The portable chemical latrines are physically unstable and have a high maintenance cost as well as user dissatisfaction.

Many of the prior art devices simply position a toilet over a pit or tank provided therebeneath. One such device is shown in the C. A. Minnitte U.S. Pat. No. 3,546,718 issued on Dec. 15, 1970 wherein a perforated tank is provided beneath the toilet for holding solids whereas the liquids pass into drain pipes located beneath the tank. A more sophisticated device is shown in the Thomas J. Wilhelmsen U.S. Pat. No. 4,501,665 issued on Feb. 26, 1985 wherein a liquid collecting tank is located to the side and lower in elevation than the solids collecting tank. Separate vents are provided for both the solids tank and the liquids tank. The patent further mentions the vents may be connected together.

Despite the prior art waterless sanitation systems, unpleasant odor still exists with many of the remote restroom facilities. Disclosed herein is a new and improved waterless sanitation system with suitable ventilation to eliminate odors while providing an environmentally safe system and user satisfaction. The system disclosed herein separates the liquids from solids and introduces fresh air through a ventilation system, assisting the decomposition and evaporation of biodegradable materials through the growth of anaerobic organisms which breakdown the waste into carbon dioxide and water. These bi-products are then released through the ventilation system.

SUMMARY OF THE INVENTION

One embodiment of the present invention is a waterless sanitation system comprising a toilet to receive liquids and solids, a first basket mounted beneath the toilet to receive the liquids and solids, the basket including apertures operable to allow the liquids to flow downwardly but blocking flow of solids, holding tank in which the first basket is mountingly suspended, the tank positioned to catch and hold the liquids flowing through the apertures, an inlet extending from outdoors into the basket and into the holding tank, the inlet directing external air into the basket and the holding tank, an outlet extending from inside the basket and inside the holding tank to outdoors, the outlet directing gas out of the basket and the holding tank, and, a fan operable to draw the external air into the inlet, through the basket and the holding tank and the gas out through the outlet.

Another embodiment of the present invention is a waterless sanitation system comprising a toilet to receive liquids and solids, a first basket mounted beneath the toilet to receive the liquids and solids, the basket including apertures operable to allow the liquids to flow downwardly but blocking flow of solids, a holding tank in which the first basket is mountingly suspended, the tank positioned to catch and hold the liquids flowing through the apertures, an inlet extending from outdoors into the basket and into the holding tank, the inlet including air directors operable to direct external air into the inlet to the basket and the holding tank, and, an outlet extending from inside the basket and from inside the holding tank to outdoors, the outlet directing gas out of the basket and the holding tank.

It is an object of the present invention to provide a waterless sanitation system having a ventilation system for removing gases from a solids holding tank and a liquids holding tank.

A further object of the present invention is to provide a forced air ventilation system for a waterless sanitation system.

Yet another object of the present invention is to provide a waterless sanitation system with a wind driven ventilation system.

Related objects and advantages of the present invention will be apparent from the following description.

DESCRIPTION OF THE PREFERRED EMBODIMENT

Figure 1:
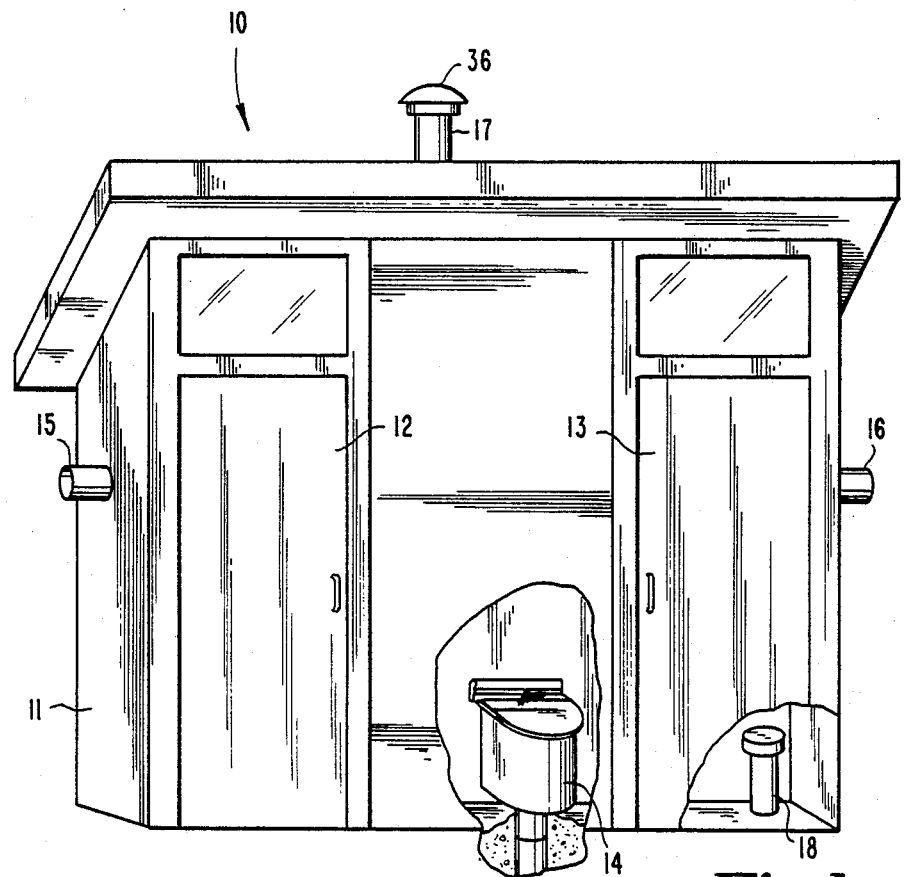
FIG. 1 is a fragmentary, perspective view of a remote restroom facility incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particular to FIG. 1, there is shown a remote restroom facility 10 including a building 11 with a pair of doors 12 and 13 opening into separate toilet facilities. A separate toilet 14 is located behind each door and includes a toilet riser with seat and lid. The bottom of each toilet empties into a pit located beneath the building for the collection of liquids and solids. A pair of air inlet conduits 15 and 16 extend outwardly through the opposite side walls of the building with the air circulation exhaust vent 17 extending through the roof of the building. A pump-out plastic PVC pipe with cap 18 is located to the side of the building and extends downwardly into the pit for withdrawal of solid material.

Figure 2:
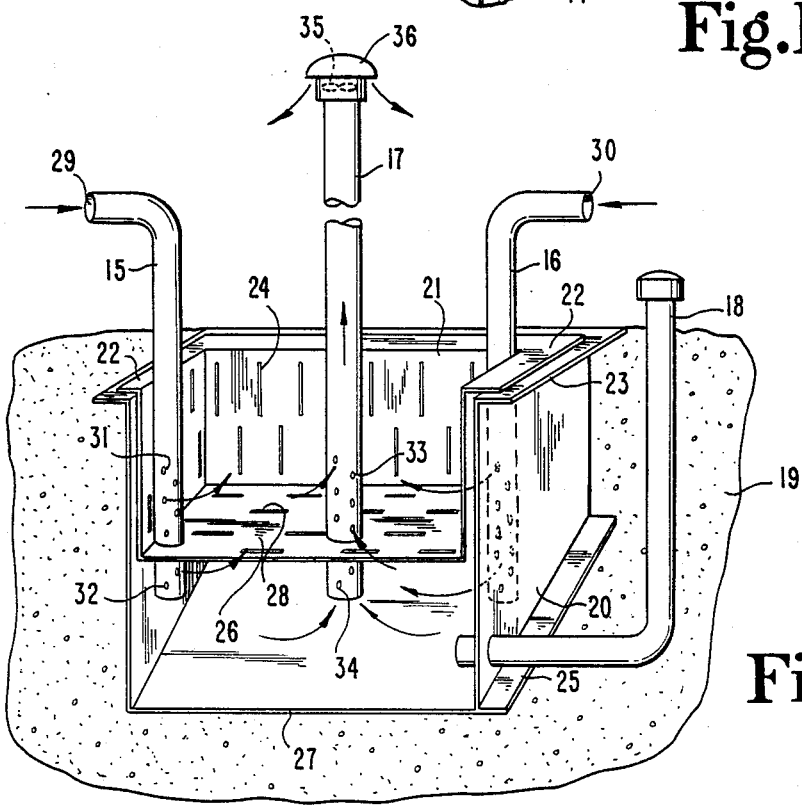
FIG. 2 is a cross sectional perspective view of the holding tanks and ventilation system for the restroom facility of FIG. 1.

A cross-sectional view of the pit located beneath building 11 is shown in FIG. 2. The pit is formed and surrounded by concrete 19 in which is permanently mounted a five sided upwardly opening liquids holding tank 20. A five sided upwardly opening solids holding basket 21 is suspendedly mounted in tank 20 by means of four outwardly extending flanges 22 which rest atop the outwardly extending top flanges 23 of tank 20. The vertical side walls of basket 21 are spaced apart from and inwardly of the vertical side walls of tank 20 in order to allow liquids within tank 21 to flow outwardly through apertures 24 located in the side walls of tank 21 and then into tank 20. The vertical side walls of tank 20 have outwardly extending bottom flanges 25 which are embedded in concrete 19 thereby securely fixing the concrete and tank 20 together. The bottom wall 26 of basket 21 is spaced upwardly from the bottom wall 27 of tank 20 to allow the liquids flowing into tank 20 to accumulate to a level which does not contact the solids within basket 21. Bottom wall 26 includes a plurality of apertures 28 through which the liquids may flow into the lower tank 20.

The toilets and/or urinals provided in building 11 have not been shown in FIG. 2 to more clearly illustrate the construction of the tanks and ventilation system; however, it is to be understood that the toilets and/or urinals empty into pipes which in turn empty into the top basket 21.

A pair of inlet pipes or conduits 15 and 16 are secured to basket 21 and extend downwardly through bottom wall 26 into liquids holding tank 20. Pipes 15 and 16 are located on the opposite side walls of basket 21 and each have a right angle or elbow top end which extends outwardly through the opposite side walls of building 11. Thus, pipe 16 has an entrance or mouth 29 opening in a direction opposite to the entrance or mouth 30 of pipe 16. By proper orientation of building 11 relative to the prevailing winds, the air inlet pipes are thereby positioned so that the wind will blow into, in most instances, the mouth of either pipe 15 or 16. It can be appreciated that two additional air inlet pipes may be provided identical to pipes 15 and 16, but which extend outwardly through the back and front wall of building 11 thereby allowing the wind to force air into at least one air inlet since a separate inlet pipe is provided for each of the four major directions.

A plurality of holes 31 are provided on each pipe 15 and 16 and are located within basket 21 causing air which is flowing downwardly through pipes 15 and 16 to exit into the basket. Likewise, additional holes 32 are provided on each pipe 15 and 16 and are located in tank 20 to allow the air flowing downwardly in the pipes to exit within tank 20. In this manner, fresh external air is provided both in basket 21 and tank 20.

An exhaust riser having a solid perforated PVC pipe 17 extends through the roof of the building and then downwardly through basket 21, through bottom wall 26 and into tank 20. A plurality of holes 33 are provided on pipe 17 and are located in basket 21 allowing the gas within the basket to flow into pipe 17. Likewise, a plurality of additional holes 34 are provided on pipe 17 and are located in tank 20 to allow the gas within tank to flow into and then upwardly through pipe 17. A conventional exhaust fan 35 is located at the top of pipe 17 thereby pulling the gas within the pipe upwardly and out through the exit of the pipe located immediately beneath a conventional rain and wind guard top 36.

A pump-out plastic PVC pipe with cap 18 is located in building 11 and extends downwardly into the pit and into tank 20 thereby allowing for the removal by a separate pump not shown of the liquids within tank 20. The system shown in FIG. 2 operates through the decomposition of feculent solids and anaerobic bacterial digestion and the evaporation of liquid bi-products. The solids and foreign objects are retained in the upper perforated fiberglass basket 21. Liquids from both usage and those released by anaerobic digestion pass through the perforations in basket 21 and into the liquids holding tank 20. Cooler outside air is introduced into tank 20 through two 4" PVC air inlet pipes 15 and 16 with the cooler outside air drawn across the liquids in the lower basket. The circulation is accomplished by 67 CFM fan in the 4" PVC exhaust pipe 17.

The airflow created by the inlet pipes 15 and 16 and aided by the fan causes the air to pass through and around the active bio-mass in the upper perforated basket 21. Therefore, the required exchange of oxygen and bi-products takes place. The airflow also insures that a sufficient supply of fresh air is available so that effective anaerobic bacterial digestion of the bio-mass can continue. The harmless gases and unpleasant odors are exhausted into the environment through the exhaust system.

In the unlikely event that the electrically driven forced air system malfunctions, the decomposition and evaporation process nevertheless continues, but at a less effective rate. As the bio mass decomposes, heat is produced which warms the air above the solid particles. This heated air escapes naturally through the exhaust pipe and replaced by the colder outside air from the two air intakes. Further, by orienting the entrance to pipes 15 and 16 relative to the wind, the cooler outside air may be driven by the wind into the pipe thereby accelerating the circulation process.

The system shown in the drawing is particularly advantageous in that the tanks produced from fiberglass and surrounded by concrete are impervious to corrosion and will not allow introduced liquids to escape into the soil since there are no seams or bolt connections underground. The immediate unpleasant odors are carried outside the building structure via sidewall ventilation while residual odors within the two tank system are removed through the forced air ventilation. The forced air ventilation, dehydration of solids, evaporation of liquids and decomposition of waste material all add to a greatly reduced pumping and maintenance program. The solids contained within basket 21 may be removed by a licensed waste water management company via the toilet riser. The liquids in the outer or lower tank 20 may be removed via the 1½" diameter pump-out pipe 18.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A waterless sanitation system comprising:
   toilet means to receive liquids and solids;
   a first basket mounted beneath said toilet means to receive said liquids and solids, said basket including aperture means operable to allow said liquids to flow downwardly but blocking flow of solids;
   a holding tank in which said first basket is mountingly suspended, said tank positioned to catch and hold said liquids flowing through said aperture means;
   an inlet conduit extending from outdoors into and through said basket and into said holding tank, said inlet conduit directing external air into said basket and said holding tank; and,
   an outlet conduit extending from inside said holding tank through said basket to outdoors, said outlet conduit directing gas out of said basket and said holding tank.

2. The waterless sanitation system of claim 1 wherein: said inlet conduit includes first exit means opening into said basket, said outlet conduit includes first entrance means opening from said basket, said exit means allowing air within said inlet conduit to flow into said basket forcing gas within said basket to flow into said entrance means and escape outdoors through said outlet conduit.

3. A waterless sanitation system comprising:
toilet means to receive liquids and solids;
a first basket mounted beneath said toilet means to receive said liquids and solids, said basket including aperture means operable to allow said liquids to flow downwardly but blocking flow of solids;
a holding tank in which said first basket is mountingly suspended, said tank positioned to catch and hold said liquids flowing through said aperture means;
inlet gas means extending from outdoors into said basket and into said holding tank, said inlet gas means directing external air into said basket and said holding tank;
outlet gas means extending from inside said basket and inside said holding tank to outdoors, said outlet gas means directing gas out of said basket and said holding tank;
power means operable to draw said external air into said inlet gas means, through said basket and said holding tank and said gas out through said outlet gas means; and wherein:
said inlet gas means includes first discrete exit means opening into said basket, said outlet gas means includes first discrete entrance means opening from said basket, said exit means allowing air within said inlet gas means to flow into said basket forcing gas within said basket to flow into said entrance means and escape outdoors through said outlet gas means; and,
said inlet gas means includes second discrete exit means opening into said holding tank, said outlet gas means includes second discrete entrance means opening from said holding tank, said second exit means allowing air within said inlet gas means to flow into said holding tank forcing gas within said holding tank to flow into said second entrance means and escape outdoors through said outlet gas means.

4. The waterless sanitation system of claim 3 wherein: said aperture means operable to allow said external air exiting into said holding tank from said second exit means to flow through said aperture means into said basket.

5. A waterless sanitation system for storage of human waste comprising:
a building with a pit therebeneath;
toilet means mounted in said building to receive human waste including both liquids and solids;
a liquids holding tank located in said pit to receive said liquids;
a solids holding basket located in said liquids holding tank to receive said solids from said toilet means;
an air inlet conduit extending from outdoors of said building receiving external air and opening both into said basket and into said tank wherein said external air is discharged;
a gas outlet conduit extending from both inside said basket and said tank to outdoors of said building whereat gas within said outlet housing is discharged.

6. The waterless sanitation system of claim 5 and further comprising:
power means operable to force external air through said air inlet conduit and gas from said tank and said basket out through said gas outlet conduit; and,
entrance means on said air inlet conduit opening to catch wind and force external air into said air inlet conduit.

7. A waterless sanitation system for storage of human waste comprising:
a building with a pit therebeneath;
toilet means mounted in said building to receive human waste including both liquids and solids;
a liquids holding tank located in said pit to receive said liquids;
a solids holding basket located in said liquids holding tank to receive said solids from said toilet means;
an air inlet housing extending from outdoors of said building receiving external air and opening both into said basket and into said tank wherein said external air is discharged;
a gas outlet housing extending from both inside said basket and said tank to outdoors of said building whereat gas within said outlet housing is discharged;
pipe means extending out of said pit to allow withdrawal of human waste therefrom; and,
entrance means on said air inlet housing opening to catch wind and force external air into said air inlet housing; and wherein:
said air inlet housing includes a plurality of upstanding pipes with top ends, said entrance means includes a plurality of horizontally extending conduits mounted to said top ends with said conduits opening in a plurality of different directions to catch wind blowing from different directions.

8. The waterless sanitation system of claim 7 wherein: said upstanding pipes extend through said basket into said tank and have apertures located both in said basket and said tank allowing air within said pipes to escape both into said basket and said tank.

9. The waterless sanitation system of claim 8 wherein: said gas outlet housing includes an upstanding tube extending from said tank and through said basket, said tube has holes located both in said basket and said tank to allow gas from said basket and said tank to flow into said tube and escape outdoors.

10. The waterless sanitation system of claim 9 wherein: said basket is located in said tank, said basket catches both said liquids and said solids from said toilet means and is perforated to allow said liquids to fall therethrough into said tank.

* * * * *